A J & A H, BEACH'S
AXLE-GAUGE
73867
PATENTED
JAN 28 1868
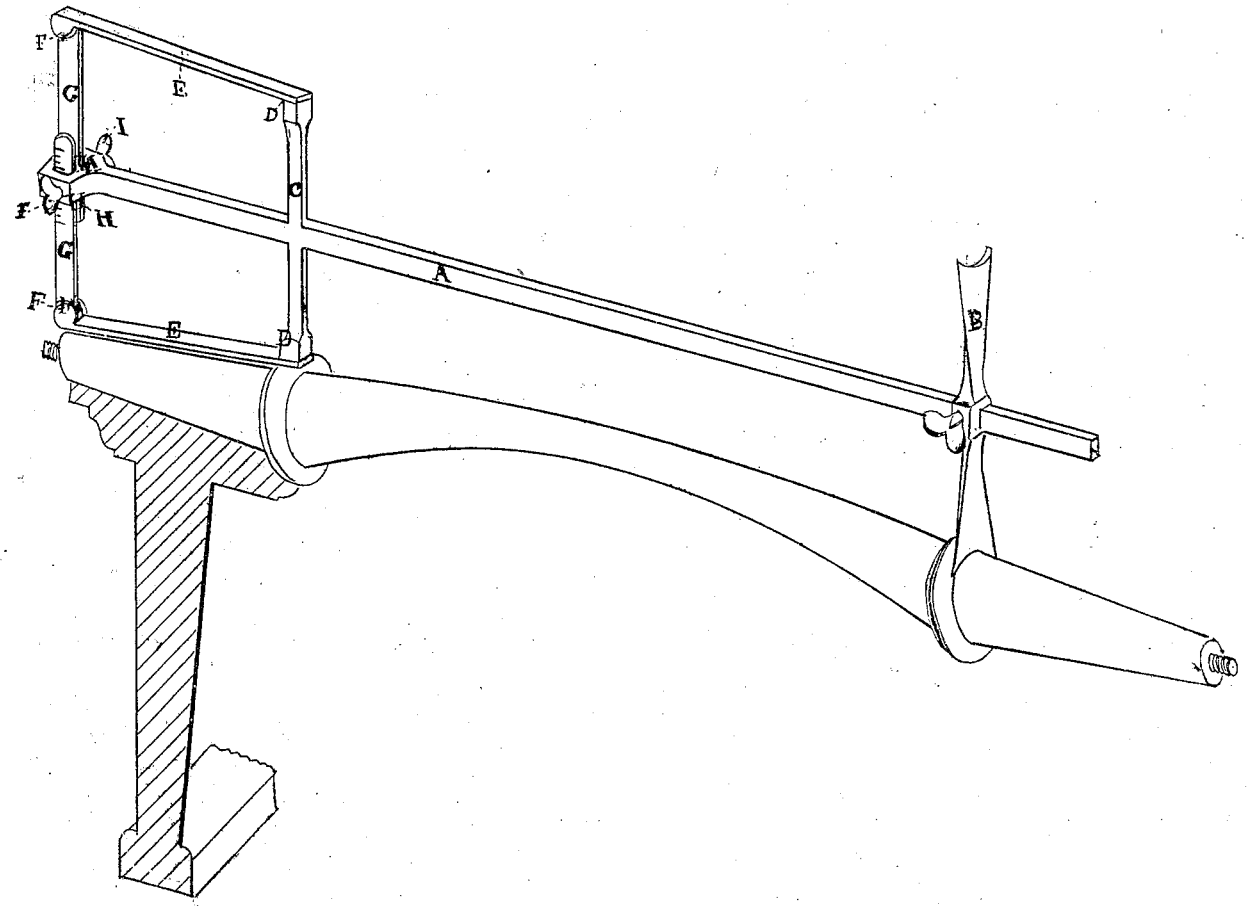
WITNESSES
H. S. Sprague
George Nuhlandt
INVENTOR
Allen J. Beach
Alex H. Beach
Per Attorney
Thos. S. Sprague

United States Patent Office.

ALLEN J. BEACH AND ALEXANDER H. BEACH, OF LINDEN, MICHIGAN.

Letters Patent No. 73,867, dated January 28, 1868.

IMPROVEMENT IN AXLE-GAUGE.

The Schedule referred to in these Letters Patent and making part of the same.

Know all men that we, ALLEN J. BEACH and ALEXANDER H. BEACH, of Linden, in the county of Genesee, and State of Michigan, have invented a new and useful Improvement in an Apparatus for Setting Wagon-Axles; and we do declare that the following is a true and accurate description thereof, reference being had to the accompanying drawings, and to the letters of reference marked thereon, and being a part of this specification.

The object of this invention is to so construct an apparatus for getting the "set" of axles or arms that it can be done accurately and expeditiously, thereby causing the wheels to run true, and prevent, to a great extent, the cutting or extra wear of the axle. By the use of this apparatus at least seventy-five per cent. will be saved, in procuring the accurate position of the wheel, over any other process now known.

To accomplish this end, we construct a horizontal bar, A, about five feet long or upward, according to width of track used. To one end of this bar A we attach the sliding gauge B. At about twelve inches from the opposite end of the bar A, crossing it, and at right angles with it, we fasten, by welding or otherwise, the angle-bar C, to which are attached, by knuckle-joints D D, the adjustable bars E E, provided with other joints, F F, by which are attached the gauge-bars G G, which work through the slots H H, in the end of the horizontal bar A, where they are held in position by the set-screws I I.

The bearings of the ends of the sliding gauge B should be precisely the same distance from the centre of the horizontal bar A as are the ends of the adjustable bars E E at the knuckle-joints D D.

What we claim as our invention, and desire to secure by Letters Patent, is—

The horizontal bar A, in combination with the sliding gauge B, the angle-bar C, provided with knuckle-joints D D, the adjustable bars E E, provided with other joints F F, the gauge-bars G G, working in the slots H H, and the set-screws I I, when constructed and arranged substantially as and for the purpose described.

ALLEN J. BEACH,
ALEXANDER H. BEACH.

Witnesses:
  A. B. DURFEE,
  FRANCES M. H. BEACH.